United States Patent [19]

Johnson

[11] Patent Number: 4,558,383
[45] Date of Patent: Dec. 10, 1985

[54] INFORMATION STORAGE DISK TRANSDUCER POSITION CONTROL SYSTEM USING A PRERECORDED SERVO PATTERN REQUIRING NO ALIGNMENT WITH THE STORAGE DISK

[75] Inventor: Mark Johnson, Mt. Kisco, N.Y.

[73] Assignee: International Business Machines Corporation, Armonk, N.Y.

[21] Appl. No.: 509,746

[22] Filed: Jun. 30, 1983

[51] Int. Cl.$^4$ ............................ G11B 5/55; G11B 5/56; G11B 7/00; G11B 23/30
[52] U.S. Cl. ........................................ 360/77; 360/78; 360/135; 369/43; 369/44
[58] Field of Search ..................... 360/75, 77, 78, 135; 369/43, 44

[56] References Cited

U.S. PATENT DOCUMENTS

| | | | |
|---|---|---|---|
| 3,426,337 | 2/1969 | Black et al. | 340/174.1 |
| 3,573,771 | 4/1971 | Cockrell, Jr. | 340/174.1 |
| 3,646,533 | 2/1972 | Rosenblum | 340/174.1 R |
| 4,326,229 | 4/1982 | Yanagisawa | 360/135 |

FOREIGN PATENT DOCUMENTS

| | | | |
|---|---|---|---|
| 2403093 | 8/1974 | Fed. Rep. of Germany | 360/135 |
| 2748215 | 5/1978 | Fed. Rep. of Germany | 360/135 |
| 0093803 | 8/1978 | Japan | 360/135 |
| 0093802 | 8/1978 | Japan | 360/135 |
| 0025704 | 2/1979 | Japan | 360/75 |

Primary Examiner—George G. Stellar
Attorney, Agent, or Firm—Ronald L. Drumheller

[57] ABSTRACT

An information storage disk is provided with a dense array of detectable marks. This pattern does not interfere with or use any otherwise available recording capacity of the storage medium. The marks are detected by a sensor different from any transducer used to read or write information into the storage medium. Information storage tracks are defined by the pattern rather than by any recorded information in the storage medium. In the preferred embodiment the storage medium is a conventional magnetic recording layer and the pattern of detectable marks are optically reflective or non-reflective spots overlying or underlying the magnetic storage medium.

The sensor is mounted over the pattern for common movement with the storage medium transducer. As the storage disk spins, the sensor produces a signal which varies as individual marks pass by. From the sensor signal is derived a signal directly related to the rate at which marks are passing under the sensor. This mark sensing rate at which marks are passing under the sensor is proportional to the product of the linear velocity of the disk under the sensor and the density of the marks in the detection region. Each discrete information storage track is characterized and defined by a discrete mark sensing rate and physically lies along a path such that the mark sensing rate obtained from the sensor attached to the transducer is substantially constant along the path and is equal to the discrete mark sensing rate characterizing and defining that track. A servo control system responding to the mark sensing rate positions the transducer such that the mark sensing rate is maintained at the rate characterizing and defining the desired track.

17 Claims, 10 Drawing Figures

INFORMATION STORAGE DISK TRANSDUCER POSITION CONTROL SYSTEM USING A PRERECORDED SERVO PATTERN REQUIRING NO ALIGNMENT WITH THE STORAGE DISK

DESCRIPTION

1. Technical Field

This invention relates to servo systems for controlling the position of a transducer with respect to a spinning information storage disk, and more particularly it relates to an optical servo system for controlling the radial position of a read and/or write head with respect to a magnetic storage disk, especially a flexible magnetic disk.

2. Background Art

It is generally desirable to increase as much as practical the amount of data which can be stored on an information storage disk. Data is generally stored on a disk along concentric circular tracks. Obviously, it is desirable to fit as many tracks as possible on a disk surface, which means that the tracks should be as narrow as practical and as close together as practical. However, it is also necessary to position a transducer over the middle of any desired track and to keep it there during rotation of the disk while data is written into the track or read from the track. As the tracks become ever smaller in width and are spaced closer and closer together, it becomes ever more difficult to correctly position the read and/or write transducer. In reality it is the ability to reliably position a transducer over the center of a desired track and to keep it so positioned during rotation of the disk which limits the practical density of the recording tracks.

With magnetic storage disks, typically an open loop positioning system with no feedback control is used to coarse position either one or an array of read/write transducers over a desired track. With flexible magnetic storage disks, this typically is the only positioning system for the transducer. With hard magnetic storage disks, coarse positionment is generally followed by fine positionment using a positioning system with feedback control to precisely position the transducer over the center of the desired track and to keep it there. The fine positioning system generally locks onto and tracks a magnetic pattern of some kind. Most of these magnetic servo schemes use a portion of the recording surface for a magnetic servo pattern. This obviously reduces the amount of recording surface available for the recording of data. Accordingly, non-magnetic servo schemes have been proposed, which have the obvious advantage that the servo pattern will not reduce the amount of surface area available for magnetic storage of data. A scheme such as this which uses an optical servo for controlling the transducer position is described in U.S. Pat. No. 3,426,337. Unfortunately, the servo pattern in this scheme and the servo patterns in all other known prior art systems still must be aligned with the disk center. This requirement significantly increases the cost of achieving optical servo control of a magnetic disk transducer and has virtually foreclosed such servo control in the flexible disk field.

It is an object of this invention to provide a servo pattern for an information storage disk transducer control system which is translation invariant and does not require alignment of the servo pattern with respect to the storage disk center.

Another object is to provide a practical optical servo system for control of the read/write transducer in a flexible magnetic disk storage system.

DISCLOSURE OF THE INVENTION

In accordance with this invention, an information storage disk is provided with a dense array of detectable marks. This pattern does not interfere with or use any otherwise available recording capacity of the storage medium. The marks are detected by a sensor different from any transducer used to read or write information into the storage medium. Information storage tracks are defined by the pattern rather than by any recorded information in the storage medium. In the preferred embodiment the storage medium is a conventional magnetic recording layer and the pattern of detectable marks are optically reflective or non-reflective spots overlying or underlying the magnetic storage medium.

The sensor is mounted over the pattern for common movement with the storage medium transducer. As the storage disk spins, the sensor produces a signal which varies as individual marks pass by. From the sensor signal is derived a signal directly related to the rate at which marks are passing under the sensor. This mark sensing rate at which marks are passing under the sensor is proportional to the product of the linear velocity of the disk under the sensor and the density of the marks in the detection region. Each discrete information storage track is characterized and defined by a discrete mark sensing rate and physically lies along a path such that the mark sensing rate obtained from the sensor attached to the transducer is substantially constant along the path and is equal to the discrete mark sensing rate characterizing and defining that track. A servo control system responding to the mark sensing rate positions the transducer such that the mark sensing rate is maintained at the rate characterizing and defining the desired track.

A major advantage of this system is that the pattern used to define the tracks is translation invariant and does not have a center, so there is no need to align the pattern with the disk spindle. As a result, the pattern can be imprinted at any convenient point in the disk fabrication process. The pattern can even be formed on the storage disk sheet material itself before the disk it cut from the material. Furthermore, the pattern itself is composed of marks which need not be identical to each other, need not be formed precisely, and need not be spaced perfectly uniformly. Very inexpensive pattern formation processes are thus possible making this system practical for use even with inexpensive flexible disks.

BRIEF DESCRIPTION OF THE DRAWINGS

FIGS. 5.1 and 5.2 illustrate alternative disk structures having a servo pattern in accordance with this invention.

DESCRIPTION OF THE PREFERRED EMBODIMENTS

Figure 1:
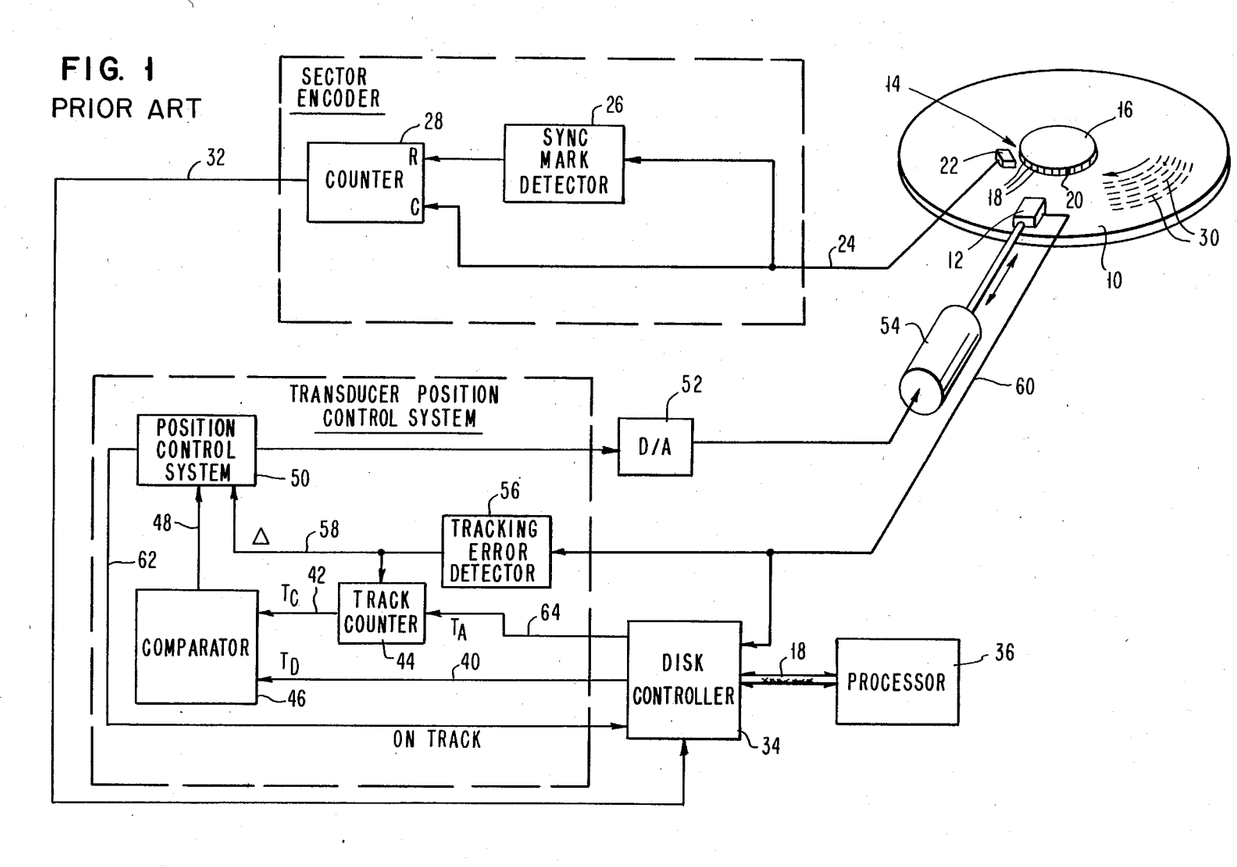
FIG. 1 schematically illustrates a prior art transducer control system for a magnetic information storage disk.

FIG. 1 schematically illustrates a magnetic information storage disk 10 and a typical prior art position control system for an associated transducer 12. Concentric magnetic tracks 30 on the disk are typically divided angularly into many equal sectors so that the position of stored information can be referenced to a particular sector beginning. Tachometer 14 supplies a signal from which the sectors are both defined and identified. A timing wheel 16 keyed to disk 10 carries timing marks 18 (which may or may not correspond one for one with sectors), as well as a distinguishable sync mark 20. The marks 18 and 20 are sensed by a suitable detector 22 (such as an optical detector, for example), which produces a signal on line 24. Counter 28 counts marks 18 and is reset by sync mark detector 26 each time it senses the signal waveform corresponding to the sync mark 20. As a result, the output of counter 28 is a discrete representation of the angular position of the disk 10 and directly or indirectly identifies the sector under transducer 12. The sector identifying information is received by a disk controller 34 via line 32.

A data source or data utilization device, such as a processor 36, originates a data transfer operation via lines 38 to disk controller 34. Disk controller 34 identifies on line 40 the track desired ($T_D$) for the next data transfer operation. The current track ($T_C$) under the transducer 12 is identified on line 42 by a track counter 44. Both the desired track $T_D$ and the current track $T_C$ are typically digital numbers. Comparator 46 inspects $T_D$ and $T_C$ and indicates via line 48 whether a coarse movement of transducer 12 is needed, the direction of such movement, and possibly the size of the required move. A position control system 50 responds to comparator 46 and via digital-to-analog converter 52 drives a linear actuator 54 connected to transducer 12 so as to bring transducer 12 over the desired track. A tracking error detector 56 ordinarily senses whether transducer 12 is centered over a track and indicates the amount of tracking error on line 58 to the position control system 50, which drives actuator 54 so as to reduce the tracking error and keep the transducer 12 centered over the track. When a coarse move is needed (to a different track), control system 50 disregards the tracking error. Track counter 44, however, typically senses from the tracking error signal the passage of the transducer over each track and keeps count of the track currently under the transducer ($T_C$). Comparator 46 senses when $T_C$ is equal to $T_D$ and so indicates to the position control system 50. After $T_C$ is equal to $T_D$, the control system 50 again responds to the tracking error signal from detector 56 and locks the transducer position onto the center of the track. Once the transducer is sufficiently close to the center of the desired track, an ON TRACK indication is given by the control system to the disk controller via line 62.

The tracking error detector responds to magnetically recorded information on the disk 10, which is extracted from the signal output line 60 connected directly to transducer 12. Various ways are known in the art for sensing or deriving tracking error information either directly from auxiliary prerecorded magnetic patterns or indirectly from the magnetically recorded data track itself. Since the exact method used for extracting the tracking information from the magnetic transducer 12 signal is not significant to the present description, a detailed description of such techniques will not be presented. The magnetic transducer signal on line 60 is also received by the disk controller 34 so that recorded information on the desired track can be read and transferred to processor 36 and so that information from processor 36 can be recorded on the desired track via controller 34.

Each track typically has a prerecorded header containing among other information a digital identification of the track itself. The track identification is read (either by the processor or the disk controller) to verify that the desired track is the track currently being accessed. If the track header indicates that the accessed track is not the desired track, even though the control system has given an ON TRACK indication via line 62, an error has occurred. Some prior art systems re-initiate the track seeking procedure again in the hope that the same error will not reoccur. Others have a way of updating or correcting the track counter via a line 64 so that the $T_C$ indicated by the track counter matches the actual track ($T_A$) read from the track. In such systems the change in $T_C$ is sensed by comparator 46, which results in movement of the transducer 12 to the correct track $T_D$.

Figure 2:
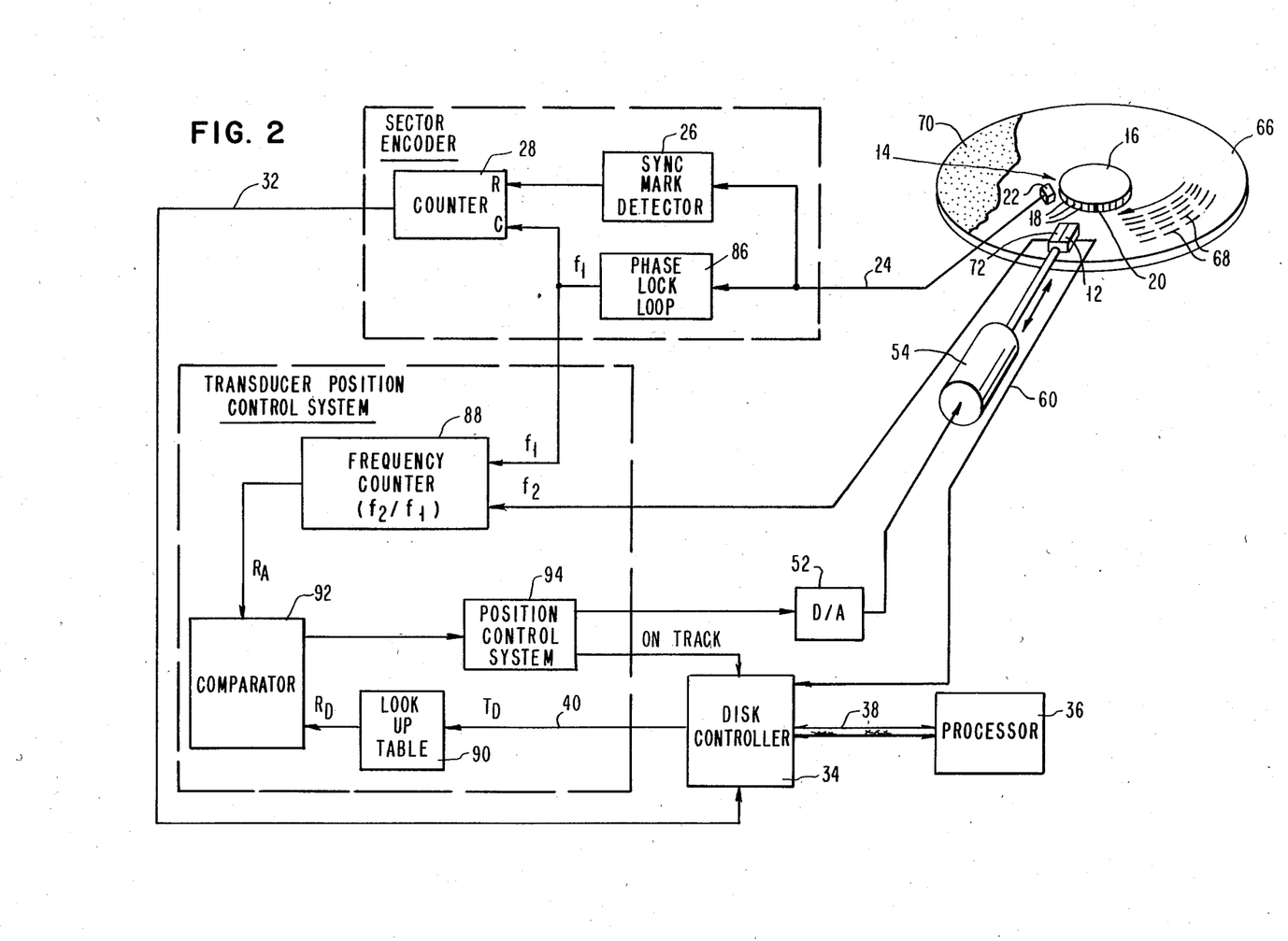
FIG. 2 schematically illustrates an optical servo control system for a magnetic information storage disk in accordance with this invention.

FIG. 2 schematically illustrates in a fashion similar to the FIG. 1 representation a magnetic information storage disk 66 and an associated transducer position control system fabricated in accordance with this invention. Magnetic storage tracks 68 on disk 66 are defined in position and shape by an optical pattern 70 in cooperation with the illustrated transducer position control system (hereinafter usually referred to as the servo control system). Optical pattern 70 is a dense two dimensional array of optically detectable marks (or spots) covering at least the whole portion of the disk surface which will at any time pass through the detection area of a sensor 72 mounted for common movement with the transducer 12. Only a portion of the optical pattern 70 is shown in FIG. 2. Sensor 72 responds to the spots or marks (hereinafter referred to simply as spots) and produces a waveform having many amplitude changes. The amplitude changes or transitions are counted to derive a rate at which transitions or amplitude changes are occurring within the sensed region. While it is not necessary for the array of spots to be uniformly distributed over the sensing region of the disk and the derived rate is not necessarily equal to the rate at which spots are passing through the region monitored by the sensor, it is easier to understand the overall operation of this invention if these assumptions are made initially.

If the rate being derived from the sensor signal is equal to the rate at which spots are passing through the region monitored by the sensor and the spots are everywhere uniformly distributed over the surface of the disk, then the derived rate is proportional to the radius at which the monitored region is located! Each discrete magnetic recording track is characterized by a discrete mark sensing rate and is defined as lying along the path which has that mark sensing rate along the entire path. If the spots are uniformly distributed and sufficiently small and numerous, the tracks will be essentially round in shape and concentric with the spindle (the center of the disk). The transducer position control system does not lock onto a track which is physically defined on the disk (either magnetically or otherwise), but instead seeks the particular mark sensing rate characterizing the desired track and follows whatever path is required to keep the mark sensing rate equal to that particular mark sensing rate. Since each track is defined as having the path which the control system will follow in keeping the mark sensing rate equal to a particular value characterizing that track, the control system will by definition follow the required path when it keeps the mark sensing rate equal to that particular value!

Figure 3:
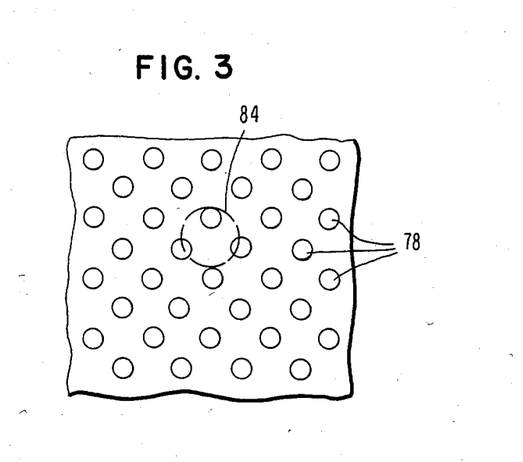
FIG. 3 is a highly magnified partial view of a uniform optical pattern which may be used by the optical servo system of FIG. 2 to define, locate and follow concentric magnetic tracks.
Figure 4:
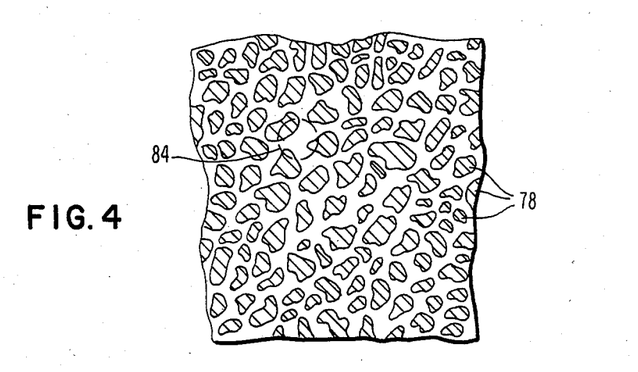
FIG. 4 is a highly magnified partial view of a non-uniform optical pattern which may be used in accordance with this invention.

Two examples of patterns which may be used in accordance with this invention are shown highly magnified in FIGS. 3 and 4. In FIG. 3, the illustrated pattern of marks is an array of identical round spots arranged in regular rows and columns with each spot equally spaced from its row and column neighbors. This is an example of a perfectly uniform pattern of marks. As will become more apparent as the detailed description proceeds, it is advantageous to have some measure of uniformity to the pattern. However, it is not necessary that the pattern be composed of marks or spots which are all identical to each other in shape or size or that the marks be equally spaced from each other. FIG. 4 illustrates a random pattern of irregularly shaped, sized and positioned spots, which is an example of a non-uniform pattern of marks useful in practicing this invention. While a uniform pattern tends to define magnetic tracks which are more perfectly round in shape, it is not necessary that the tracks be round. Non-uniform patterns also may be used and in fact may be easier and cheaper to form on a recording disk.

As will become more apparent, the pattern is translationally invariant in that it may be shifted in any direction with respect to the disk center without detrimentally affecting the operation of the system. This is a very advantageous aspect because as a consequence the pattern can be applied to a disk before the spindle hole is formed. No alignment of the pattern is required with respect to the disk. The pattern can be applied to disk material even before the disk is cut from the material.

Figure 51:
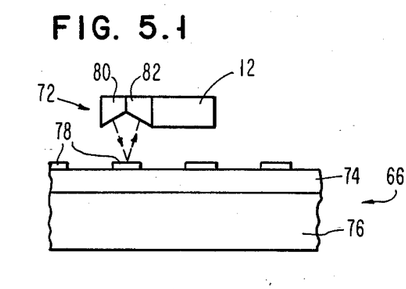
Figure 52:
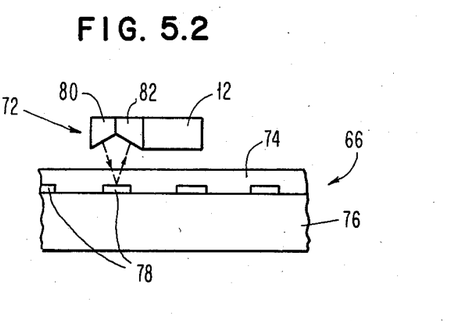

A mark sensor 72 is mounted for common movement with transducer 12. While it is not necessary that sensor 72 be physically attached to transducer 12 as shown, the system does assume that the transducer remains always in the same relative radial position with respect to the sensor 72. It is assumed in the illustrated embodiments that the pattern is an optical pattern and that the mark sensor is an optical sensor. Other sensors and corresponding patterns could be used instead so long as the mark pattern does not interfere with the operation of transducer 12. For example, a capacitive sensor or an acoustic sensor could be used to detect a topological pattern. While it is preferred that the reference pattern will be imprinted and sensed using a method different from the method used to store and retrieve information from the track defined by reference to the pattern, this is not fundamentally required. It is possible for the reference pattern to be buried in the disk away from the information storage layer (or the other way around), or for the reference pattern to be on the other side of the disk remote from the information storage layer, so long as each can be separately sensed without interfering with the other. FIGS. 5.1 and 5.2 illustrate alternative constructions for disk 66 in cross-section. A magnetic recording layer 74 and an optical pattern of reflective marks 78 are both carried by a substrate 76. In FIG. 5.1, the optical pattern is on top of the magnetic recording layer. The substrate might be made of aluminum, for example, with a magnetic recording layer of ferrite and reflective marks of aluminum. In FIG. 5.2, the optical pattern in under the magnetic recording layer. Conventional magnetic recording layers of ferrite, for example, are so thin that they are virtually transparent at many optical wavelengths of interest. The substrate in FIG. 5.2 might be formed of mylar, for example, and carry an aluminum pattern and a ferrite recording layer. FIG. 5.1 illustrates a typical hard disk embodiment while FIG. 5.2 illustrates a typical flexible disk embodiment. FIGS. 5.1 and 5.2 also illustrate a magnetic transducer 12 flying above the disk 66 and a optical sensor 72 attached to the magnetic transducer.

The optical sensor 72 is shown as having separate light emitting and light detecting parts 80, 82 for illustration, but any kind of detector structure could be used instead.

In FIGS. 3 and 4, a sensing region 84 shown by a broken circle is superposed on the mark pattern to indicate the approximate relative size of a mark 78 with respect to the optical sensing region. As previously explained, what is desired is a measurement of the rate at which transitions or amplitude changes are occurring in the sensor signal, which may or may not be directly related to the absolute rate at which spots are passing through the sensing region. Accordingly, the relative size of the sensing region with respect to the mark size (or average mark size) is varied in practice until an optimum detector signal is obtained. It should be understood that with the aid of appropriate signal processing, an optimum detector signal might be achieved with either a significantly larger or a significantly smaller relative sensing region.

Since the recording tracks are located and followed by a servo system which relies only upon a rate signal (the mark sensing rate) and the absolute magnitude of this rate signal varies proportionally with the rotation speed of the disk, either the rotation speed of the disk must be very accurately controlled or it must be measured and used to correct or compensate the measured mark sensing rate. In general accurate control of the disk speed would require sensing or measurement of the disk speed anyway. Accordingly, it is preferred that the measured disk speed be used directly to compensate the measured mark sensing rate. Referring again to FIG. 2, a tachometer 14 is shown which operates much the same as the tachometer 14 shown in FIG. 1 and described in detail in connection therewith. Similar reference numbers are used to identify corresponding parts. A reference frequency $f_1$ is derived from the tachometer signal on line 24 by passing the signal through a phase lock loop 86 to remove the tachometer sync mark waveform detected by the sync mark detector 26. Sector identifying information is derived and sent to disk controller 34 via line 32 as previously described.

The mark sensing rate is represented in FIG. 2 as an instantaneous frequency $f_2$ received by a frequency counter 88 directly from sensor 72. It should be understood that certain signal conditioning or processing functions may or may not be performed on the raw sensor signal before it actually reaches frequency counter 88 as illustrated. Since certain mark patterns, such as a uniform pattern of identical round spots, probably do not require any special processing or conditioning before reaching the frequency counter 88. The frequency counter itself automatically applies the equivalent of a thresholding and clipping function anyway.

Figure 6:
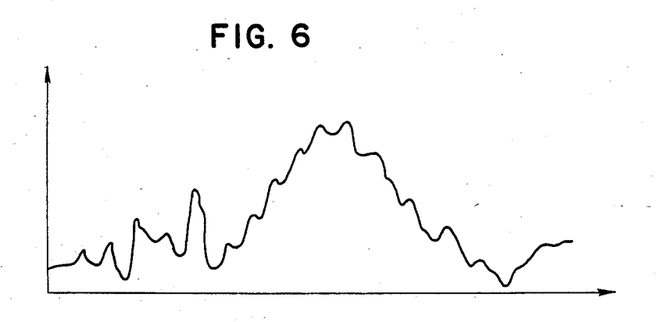
FIG. 6 illustrates a typical signal obtained from an optical sensor positioned above a non-uniform optical pattern on a spinning information storage disk.
Figure 7:
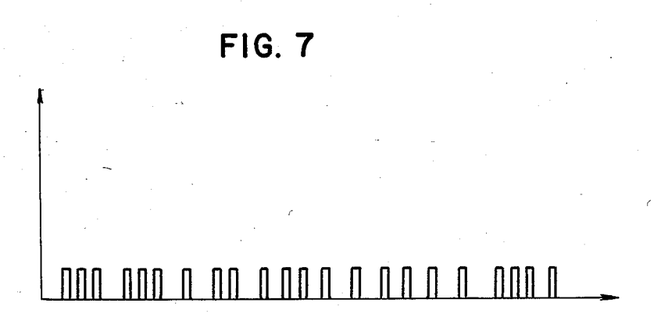
FIG. 7 illustrates a typical processed signal obtained by filtering, thresholding and clipping a detected signal of the type shown in FIG. 6.

A typical raw sensor signal from a non-uniform pattern is illustrated in FIG. 6. It contains many changes in amplitude from which a pulse train may be extracted by applying suitable signal processing such as frequency filtering, thresholding and clipping. FIG. 7 illustrates a typical pulse train which might be derived from a sensor signal. The pulses occur at typically irregularly spaced times and are characteristic of and determined by the pattern of spots. While no precise correlation is required between the derived pulses and the actual passage of individual spots through the sensing region, it is necessary that the rate at which pulses are derived from the pattern gradually increases as the radial position of the sensor increases. This tends to occur automatically because the velocity of the spots relative to the sensed region (and therefore ordinarily also the number of spots passing through the sensed region per unit time) gradually increases with radial position, assuming of course that large variations in average mark density do not occur so suddenly that the effect of the increasing linear speed of the disk with radial position is counteracted thereby.

Frequency counter 88 produces an output digital signal $R_A$ representing the ratio between $f_1$ and $f_2$. $R_A$ thus is a relative measure of the actual radial position of the sensor. $R_A$ increases with radial position in the same manner that the mark sensing rate increases with radial position. If the pattern is uniform and the mark sensing rate increases linearly with radial position, $R_A$ also linearly increases with radial position. $R_A$ has already been scaled by the actual rotary speed of the disk.

As in the FIG. 1, a data source or data utilization device, such as a processor 36, originates a data transfer operation via lines 38 to disk controller 34. Disk controller 34 identifies on line 40 the track desired ($T_D$) for the next data transfer operation. The desired track $T_D$ is typically a digital number from which the corresponding characteristic radius of the desired track $R_D$ must be obtained (represented as a particular mark sensing rate). This conversion is a simple one for one transformation, which is conveniently done in practice by using a look up table 90. This conversion may be and probably will be done by the same processor which implements other functions such as the disk controller functions. For illustration, various functions are shown as separate blocks when in practice many of the functions would be implemented with a single processor suitably programmed to perform these functions.

The actual radius position of the sensor $R_A$ is then compared with the desired radius position of the sensor $R_D$ by a comparator 92. The difference or error is sent to a position control system 94 which drives linear actuator 54 via A/D converter 52 so as to reduce the error. When the error reported by comparator 92 is sufficiently small that the transducer is on the desired recording track, an ON TRACK indication is reported to disk controller 34 so that data then can be written into or read from the desired track by the disk controller. The servo system just described moves the sensor to a radius position such that the mark sensing rate becomes equal to the characteristic mark sensing rate for the desired track and keeps adjusting the radial position of the sensor so as to maintain that characteristic mark sensing rate.

Figure 8:
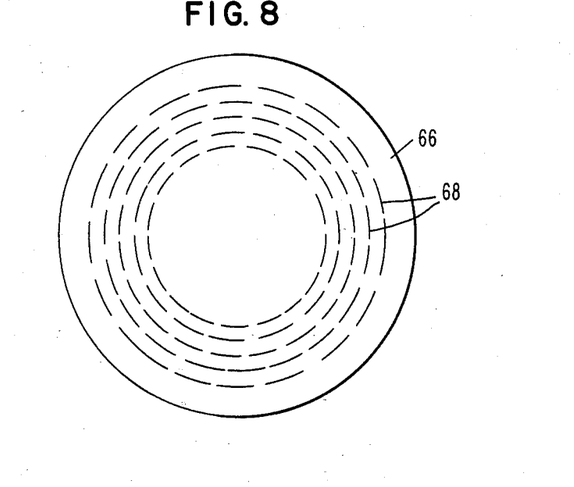
FIG. 8 is a plan view of the typically circular and concentric magnetic recording tracks defined by the servo system of FIG. 2 using a uniform optical servo pattern.
Figure 9:
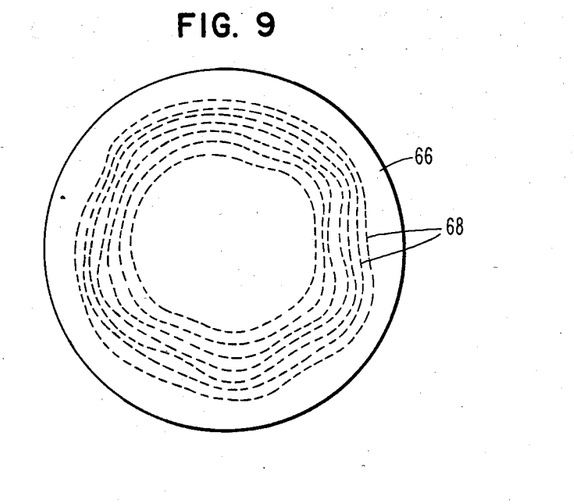
FIG. 9 is a plan view of the typically non-circular magnetic recording tracks defined by the servo system of FIG. 2 using a non-uniform array of marks for the optical servo pattern.

FIG. 8 illustrates the characteristic recording track pattern which will occur when the mark pattern is such that the mark sensing rate linearly increases with the radial position of the sensor. Each of the recording tracks 68 is essentially round and concentric with the disk or spindle center. FIG. 9 illustrates instead a typical recording track pattern which might occur when the mark pattern is not uniform. Each track in general follows a noncircular path and does not cross or get too close to any neighboring track. The noncircular paths result as the servo system follows whatever path results in the mark sensing rate being held at the desire constant value. It should be apparent that the mark pattern preferably should be substantially uniform so as to not require that the servo system follow a track with excessive radial variation and to assure that the adjacent tracks do not get too close together. Use of a mark pattern with a large degree of nonuniformity probably would result in a need to space the recording tracks farther apart (an increased difference between successive characteristic mark sensing rates). This would be disadvantageous because it would lower the recording track density.

Having thus described my invention, what I claim as new and desire to secure by Letters Patent is:

1. Information storage apparatus, comprising:
   an information storage disk having a recording surface,
   a detectable pattern on said disk for defining separate recording tracks,
   said detectable pattern comprising a dense array of detectable marks on said disk,
   said dense array being substantially translation invariant.

2. Information storage apparatus as defined in claim 1 wherein said dense array of marks is coextensive with the recording surface of said storage disk.

3. Information storage apparatus as defined in claim 1 wherein said dense array is a uniform pattern of substantially identical marks.

4. Information storage apparatus as defined in claim 1 wherein said dense array is a non-uniform pattern of marks which are not identical to each other.

5. Information storage apparatus as defined in claim 1 wherein said dense array is a randomly arranged pattern of randomly shaped and sized marks.

6. Information storage apparatus as defined in claim 1 wherein said dense array is a closely spaced pattern of individually detectable spots.

7. Information storage apparatus as defined in claim 1 wherein said pattern is an optically detectable pattern.

8. Information storage apparatus as defined in claim 1 wherein said dense array is a pattern of reflective spots on said disk.

9. Information storage apparatus as defined in claim 8 wherein said reflective spots are circular.

10. Information storage apparatus as defined in claim 9 wherein said circular spots are uniformly arranged.

11. Information storage apparatus as defined in claim 8 wherein said pattern of reflective spots is nonuniform.

12. Information storage disk apparatus of the type wherein a radially positionable transducer reads information from or writes information into any desired one of many individual information storage tracks on a spinning information storage disk, comprising:
- a translationally invariant pattern of detectable marks carried by said information storage disk;
- a mark detector mounted for common movement with said transducer for detecting the rate at which said marks pass said detector;
- means defining a plurality of individual information storage tracks, each individual storage track corresponding to a discrete mark detection rate, each discrete mark detection rate defining an individual mark detector path on said storage disk along which the rate at which said marks are detected by said mark detector substantially equals said discrete detection rate; and
- means for controlling the radial position of said mark detector so as to cause said mark detector to follow any desired one of said individual mark detector paths,
- said commonly mounted transducer thereby following the corresponding individual information storage track defined thereby.

13. Information storage disk apparatus as defined in claim 12, and further comprising:
- means for measuring the angular velocity of said disk; and
- means for continuously referencing the rate at which marks are detected by said mark detector to the measured angular velocity of said disk to produce a mark detection rate which is substantially independent of disk rotation speed variations.

14. Information storage disk apparatus as defined in claim 12 wherein said disk is a flexible magnetic storage disk and said pattern is an optical pattern.

15. Information storage disk apparatus as defined in claim 14 wherein said optical pattern is between a magnetic information storage layer and a supporting substrate.

16. In information storage disk apparatus of the type wherein a radially positionable transducer reads information from or writes information into a desired one of many individual information storage tracks on a spinning disk, the improvement comprising:
- a dense array of detectable marks on said disk;
- sensor means mounted for common radial movement with said transducer, said sensor means defining a mark sensing region on said disk, said mark sensing region moving radially with said sensor means and transducer, said sensor means detecting passage of said marks through said mark sensing region as said disk spins;
- means responsive to said sensor means for obtaining a current mark sensing rate corresponding to the rate at which said marks are currently passing through said sensing region;
- means defining a discrete mark sensing rate corresponding with each information storage track on said disk and for producing a desired discrete mark sensing rate corresponding with a desired information storage track;
- servo means responsive to said current mark sensing rate and said desired discrete mark sensing rate for continuously adjusting the radial position of said transducer and sensor means so that the current mark sensing rate becomes substantially equal to and remains substantially equal to said desired discrete mark sensing rate,
- whereby said transducer follows a desired information storage track defined by a discrete mark sensing rate.

17. The improvement of claim 16 wherein said means for obtaining a current mark sensing rate further comprises means for sensing the angular velocity of said disk, the rate at which said sensor detects passage of said marks through said sensing region being scaled by the sensed angular velocity of said disk to obtain said current mark sensing rate.

* * * * *